(12) United States Patent
Lannutti et al.

(10) Patent No.: US 9,121,495 B2
(45) Date of Patent: Sep. 1, 2015

(54) ACCESSORY DRIVE DECOUPLER

(71) Applicants: Anthony E. Lannutti, Fayetteville, AR (US); Kevin G. Dutil, Bentonville, AR (US); James H. Miller, Ortonville, MI (US)

(72) Inventors: Anthony E. Lannutti, Fayetteville, AR (US); Kevin G. Dutil, Bentonville, AR (US); James H. Miller, Ortonville, MI (US)

(73) Assignee: DAYCO IP HOLDINGS, LLC, Troy, MI (US)

( * ) Notice: Subject to any disclaimer, the term of this patent is extended or adjusted under 35 U.S.C. 154(b) by 144 days.

(21) Appl. No.: 13/839,182

(22) Filed: Mar. 15, 2013

(65) Prior Publication Data

US 2014/0274506 A1 Sep. 18, 2014

(51) Int. Cl.
F16H 55/36 (2006.01)
F16D 43/14 (2006.01)
F16D 43/18 (2006.01)

(52) U.S. Cl.
CPC ............... *F16H 55/36* (2013.01); *F16D 43/18* (2013.01); *F16D 2043/145* (2013.01); *F16H 2055/366* (2013.01)

(58) Field of Classification Search
CPC .......... F16D 43/18; F16D 43/16; F16D 41/22
USPC ...................... 474/69, 70, 133, 135
See application file for complete search history.

(56) References Cited

U.S. PATENT DOCUMENTS

| | | | |
|---|---|---|---|
| 2,685,946 A * | 8/1954 | Pferd et al. | 188/184 |
| 2,718,952 A * | 9/1955 | Thompson | 192/105 BA |
| 2,801,724 A * | 8/1957 | Spronl | 192/105 CD |
| 3,395,553 A | 8/1968 | Stout | |
| 3,618,730 A | 11/1971 | Mould, III | |
| 3,738,456 A | 6/1973 | Russell et al. | |
| 3,893,554 A | 7/1975 | Wason | |
| 4,192,412 A | 3/1980 | Stoner | |
| 4,226,320 A | 10/1980 | St. John | |
| 4,433,765 A | 2/1984 | Rude et al. | |
| 4,566,567 A | 1/1986 | Miyatake | |
| 4,763,764 A | 8/1988 | Smith | |
| 4,867,292 A | 9/1989 | Hartig | |

(Continued)

FOREIGN PATENT DOCUMENTS

WO 96/12122 4/1996

OTHER PUBLICATIONS

PCT, International Search Report and Written Opinion, PCT/US2014/017552 (Jun. 6, 2014).

*Primary Examiner* — Michael Mansen
*Assistant Examiner* — Michael Riegelman
(74) *Attorney, Agent, or Firm* — Thompson Hine LLP

(57) ABSTRACT

Pulley assemblies are disclosed that include a pulley body, a hub disposed within the bore of the pulley body, and a one-way clutch concentric about the hub. The one-way clutch has a plurality of cantilevered members that each include a friction surface and a cantilevered end and a biasing member in contact with one cantilevered member to bias the cantilevered members into continuous frictional engagement with the bore of the pulley body. Each of the cantilevered members is pivotable about its cantilevered end and is partially nested within an adjacent cantilevered member to form an annular body. This construction places the friction surface of each cantilevered member facing the bore of the pulley body. In operation, the pulley body rotates in a predominant direction which activates the plurality of cantilevered members to link the pulley body to the hub for simultaneous rotation.

20 Claims, 6 Drawing Sheets

(56) References Cited

U.S. PATENT DOCUMENTS

| | | | |
|---|---|---|---|
| 4,903,810 A * | 2/1990 | Stock et al. ............... | 192/103 B |
| 5,139,463 A | 8/1992 | Bytzek et al. | |
| 5,156,573 A | 10/1992 | Bytzek et al. | |
| 5,598,913 A | 2/1997 | Monahan et al. | |
| 5,617,937 A | 4/1997 | Zettner et al. | |
| 6,083,130 A | 7/2000 | Mevissen et al. | |
| 6,093,991 A | 7/2000 | Tanaka | |
| 6,129,189 A | 10/2000 | Kerr | |
| 6,231,465 B1 | 5/2001 | Quintus | |
| 6,253,896 B1 * | 7/2001 | Notaras et al. ......... | 192/105 CD |
| 6,659,248 B2 | 12/2003 | Terada | |
| 7,056,247 B2 | 6/2006 | Fujiwara et al. | |
| 7,124,868 B2 | 10/2006 | Takasu | |
| 7,931,552 B2 | 4/2011 | Pendergrass et al. | |
| 7,951,030 B2 | 5/2011 | Ward et al. | |
| 2004/0185976 A1 * | 9/2004 | Meckstroth et al. .......... | 474/101 |
| 2007/0142148 A1 | 6/2007 | Joslyn et al. | |
| 2010/0147646 A1 | 6/2010 | Lannutti et al. | |
| 2013/0161150 A1 | 6/2013 | McCrary | |

* cited by examiner

ACCESSORY DRIVE DECOUPLER

TECHNICAL FIELD

The present application relates generally to pulleys and more particularly to a pulley assembly that includes decoupling mechanisms with or without isolation that include self-energizing cantilevered members.

BACKGROUND

It is known to drive various automobile accessory assemblies, including for example a water pump, an alternator/generator, a fan for cooling coolant, a power steering pump, and a compressor, using the vehicle engine. In particular, a driving pulley actuated by an engine shaft of the motor vehicle drives an endless drive belt that in turn drives the accessory assemblies through driven pulleys.

Periodic torque pulses initiated by, for example, combustion engine firing can create significant speed transitions which can interrupt smooth operation of the driven components. In addition, inertial and driven speed transitions associated with startup, shutdown, jake braking, gear shifting, etc. can also interrupt operation of the driven components. These transitions can result in undesirable effects such as belt jump, belt wear, bearing wear, noise, etc.

The engine, driving belt system, and driven accessory are comprised of primary and additional driving/driven speeds and frequencies. These are characteristic of the system and usually will meet desired operating targets while being relatively stiffly connected by the belt drive system. However at some operating points and/or conditions these speeds and frequencies contribute to unwanted noise, compromise system or component integrity, or contribute to reduced service life of the belt system or individual component. Current solutions provide for overrunning of an accessory exist and others provide for torsional isolation, but improvements are needed that outperform, last longer, and are more cost effective to manufacture.

SUMMARY

Improved driven pulley assemblies are disclosed that utilizes torque-sensitive coupling and de-coupling to permit one-way relative motion between an input shaft of a driven accessory and an outer driven sheave of the pulley assembly. When the sheave of the pulley assembly is being driven in the predominant direction of rotation, the clutching mechanism of the pulley assembly engages and drives the accessory input shaft for the desired smooth rotation. When relative torque reversals occur as a result of, for example, driven speed transitions, the internal clutching mechanism of the proposed pulley assembly disengages the driven accessory shaft from the outer driven sheave, thereby permitting the driven shaft to continue to rotate with momentum in the predominant direction of rotation.

The invention relates to a belt drive assembly for driving belt driven accessories in an engine of an automotive vehicle, and more particularly, to a decoupling mechanism for allowing the belt driven accessories to operate temporarily at a speed other than that of the belt drive assembly.

One object of the pulley assemblies herein is to provide both overrunning and decoupling capability that exceeds current performance and maintains the level of practicality demanded by the automotive industry. Another object is to provide a pulley assembly that is more axially compact and has a smaller diameter. This provides more versatility in use and placement in belt drive systems of various engine types.

In one aspect, these objects are achieved by pulley assemblies that include a pulley body, a hub disposed within the bore of the pulley body, and a one-way clutch concentric about the hub. The one-way clutch has a plurality of cantilevered members that each include a friction surface and a cantilevered end and a biasing member in contact with one cantilevered member to bias the cantilevered members into continuous frictional engagement with the bore of the pulley body. Each of the cantilevered members is pivotable about its cantilevered end and is partially nested within an adjacent cantilevered member to form an annular body. This construction places the friction surface of each cantilevered member facing the bore of the pulley body. In operation, the pulley body rotates in a predominant direction which activates the plurality of cantilevered members to link the pulley body to the hub for simultaneous rotation. Then, during an operational condition that reduces the speed of the pulley body, the hub disengages therefrom and is able to overrun by maintaining rotation in the predominant direction.

In one embodiment, the pulley assemblies may have a plurality of biasing members distributed as one biasing member per cantilevered member to bias the respective cantilevered member into continuous frictional engagement with the bore of the pulley body. To connect the cantilevered members to the hub, the hub includes a plurality of connectors to each connect one cantilevered member, at its cantilevered end, to the hub.

In another embodiment, the pulley assemblies include a torsion spring having a first end operationally coupled to the one-way clutch and a second end operationally coupled to the hub. The torsion spring provides isolation to the assembly to protect the components from vibrations and/or torsionals. When the torsion spring is present, the rotation of the pulley body in the predominant direction activates the plurality of cantilevered member, which thereby wind or unwind the torsion spring to link the pulley body to the hub for simultaneous rotation together in the predominant direction. Here again, during an operational condition when the speed of the pulley body is less than the hub, the hub disengages therefrom and is able to overrun by maintaining rotation in the predominant direction. To connect the torsion spring to the cantilevered members, the pulley assemblies may include a spool that has a plurality of connectors for connection of the cantilevered members thereto.

Advantages and features of the invention will be apparent from the following description of particular embodiments and from the claims.

DETAILED DESCRIPTION

Figure 1:
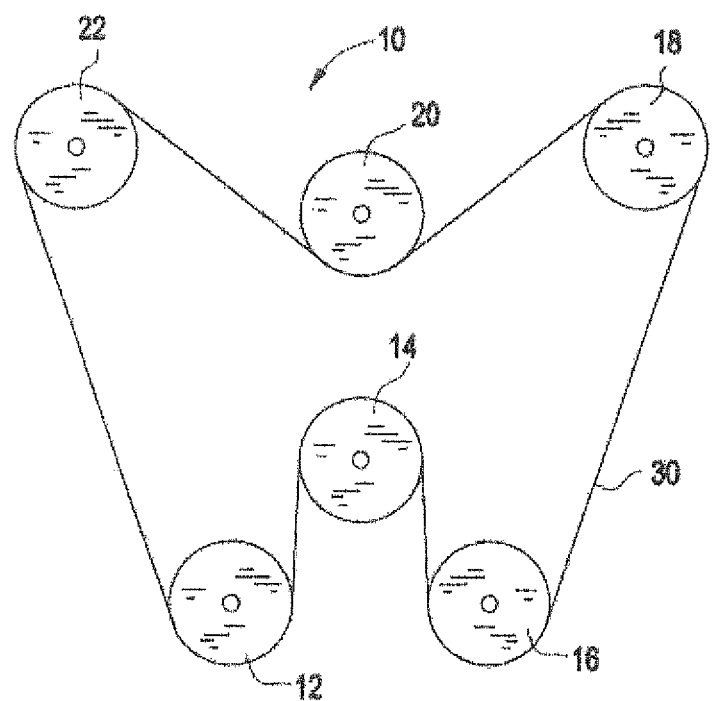
FIG. 1 is a diagrammatic view of an embodiment of an accessory drive system.

The following detailed description will illustrate the general principles of the invention, examples of which are additionally illustrated in the accompanying drawings. In the drawings, like reference numbers indicate identical or functionally similar elements.

Referring to FIG. 1, an accessory drive system 10 of, for example, an internal combustion engine of an automobile includes an endless belt 30 that is used to drive a number of accessories. The various accessories are represented in FIG. 1 diagrammatically by their pulley assemblies. The belt 30 is entrained around a crank pulley assembly 12, a fan/water pump pulley assembly 14, an alternator pulley assembly 16, a power steering pulley assembly 18, an idler pulley assembly 20 and a tensioner pulley assembly 22. In some embodiments, the tensioner pulley assembly 22 includes damping, such as asymmetric damping with a frictional damper to resist lifting of the tensioner arm away from the belt 30.

The various accessories are driven through use of pulley assemblies 14, 16, 18, 20 and 22 that are themselves rotated by the belt 30. For purposes of description, pulley assembly 16 of an alternator will be focused on below. It should be noted, however, that the other pulley assemblies of one or more of the other accessories may also operate in a fashion similar to that of pulley assembly 16. Furthermore, the pulley assembly may be the crank pulley 12 as discussed herein.

Figure 2:
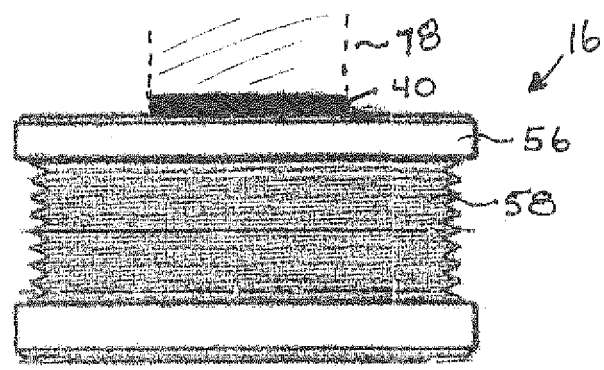
FIG. 2 is a front view of a pulley assembly connectable to a shaft.

Referring now to FIG. 2, pulley assembly 16 transfers input torque from the belt 30 of FIG. 1 to an input shaft 78 of an accessory, for example an alternator, when rotated in a predominant rotational direction and also disengages the input shaft 78 to protect it from relative torque reversals between the pulley assembly 16 and the input shaft 78. When such relative torque reversals between the pulley assembly 16 and the input shaft 78 occur, an internal decoupler system of the pulley assembly 16 acts to disengage the input shaft 78 from the torque reversal, also referred to as an overrunning condition, thereby permitting the accessory input shaft 78 to continue rotating with momentum in the predominate operational direction.

The pulley assembly 16 includes a hub 40 that is engageable with the input shaft 78 of the accessory housed within a pulley body 56 that has a belt-engaging surface 58. The hub 40 may be mated to the input shaft 78 by a Woodruff key, as is well known, to prevent the hub 40 from freely rotating about the input shaft. Of course other connections between the hub 40 and the input shaft 78 are also possible including, for example, a spline, thread, or press fit.

Figure 3:
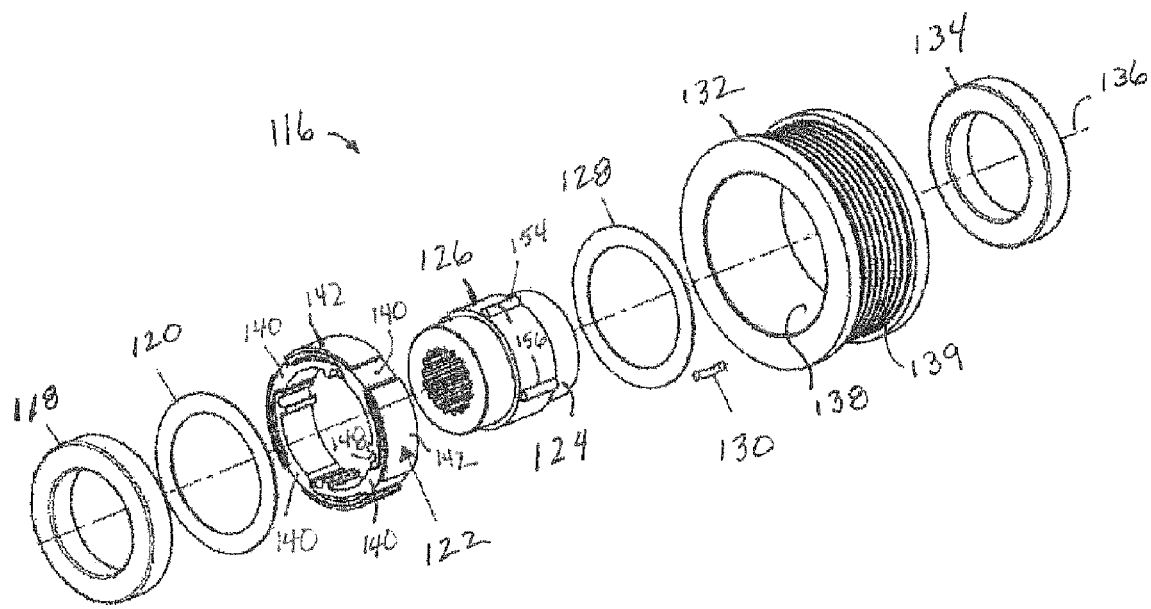
FIG. 3 is an exploded, perspective view of one embodiment of a pulley assembly for use in a system such as that illustrated in FIG. 1.
Figure 4:
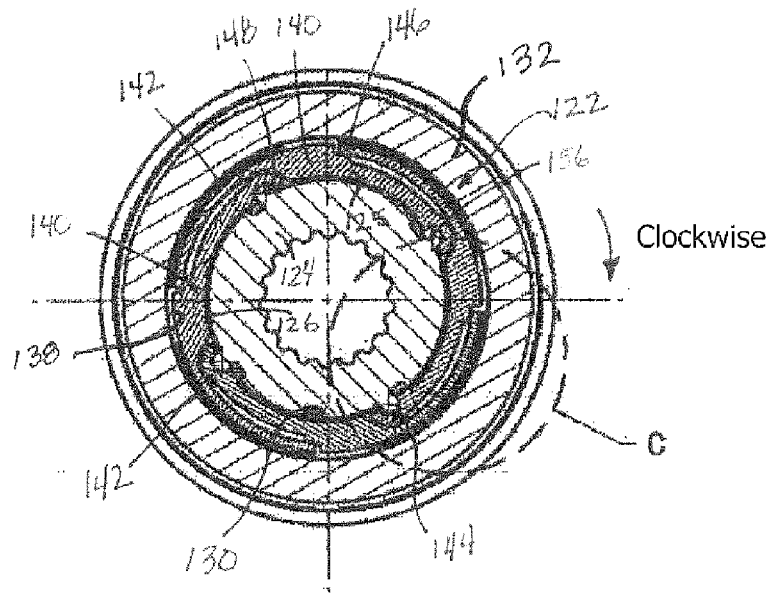
FIG. 4 is a top, plan view of a transverse cross-section of the pulley assembly of FIG. 3 when assembled.
Figure 5:
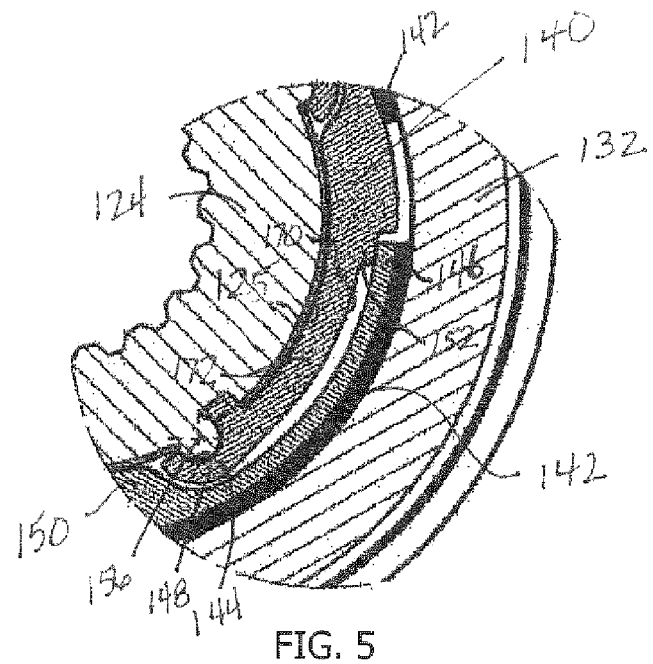
FIG. 5 is an enlarged top plan view of Section C in FIG. 4.
Figure 6:
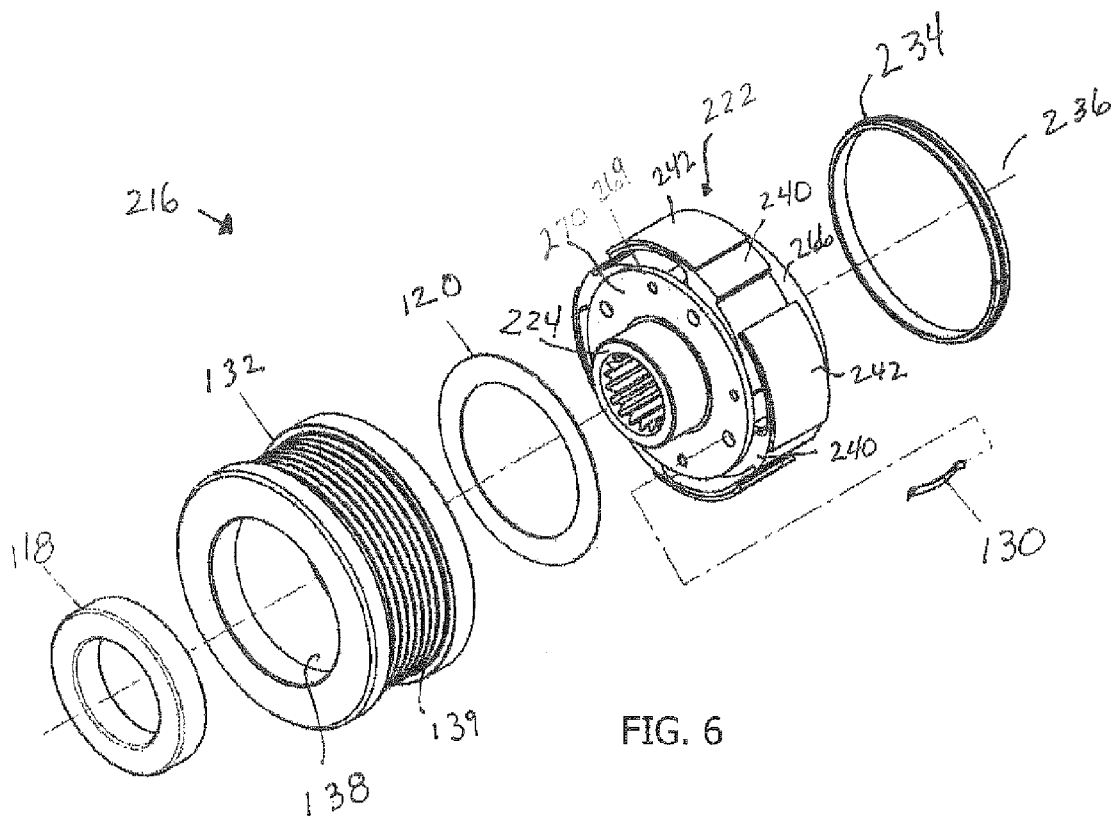
FIG. 6 is an exploded, perspective view of a second embodiment of a pulley assembly for use in a system such as that illustrated in FIG. 1.

Now referring to FIGS. 3-5, the pulley assembly, generally designed as 116, includes, from left to right based on the orientation of the page, a first bearing 118, a first bushing 120, a one-way clutch mechanism 122, a hub 124, a sleeve 126, a second bushing 128, a biasing member 130, a pulley body 132, and a second bearing 134. When assembled (FIG. 4), the hub 124, which defines the axis of rotation 136, is disposed within the bore 138 of the pulley body 132 along with a one-way clutch 122. The pulley body includes a belt-engaging surface 139 as part of its exterior surface. The one-way clutch 122 is concentric about the hub 124 and includes a plurality of cantilevered members 140 that each include a friction surface 142 and have a cantilevered end 144 and a free end 146. Each cantilevered member 140 is pivotable about the cantilevered end 144 and is partially nested within an adjacent cantilevered member 150 (labeled in FIG. 5) to form an annular body having the friction surface 142 of each cantilevered member 140 facing the bore 138 of the pulley body 132. The one-way clutch 122 also includes a biasing member 130 contacting at least one of the plurality of cantilevered members 140 to bias the plurality of cantilevered members 140 into continuous frictional engagement with the bore 138 of the pulley body 132.

In this embodiment, the cantilevered end 144 of each cantilevered member 140 is pivotally connected to the hub 124. Here, the hub 124 includes a plurality of connectors 154 that are elongate protrusions 156 on the exterior surface 125 of the hub 124 upon which the cantilevered ends 144 are seated. In one embodiment, the plurality of connectors 154 may be integral with the hub 124. In another embodiment, as illustrated in FIGS. 3-5, the connectors 154 may be formed as part of a sleeve 126 that fits over the shaft 124. To seat the cantilevered ends 144 to the elongate protrusions 156, each cantilevered end 144 includes a half-pipe channel 148 on the side facing the hub 124 and receives an elongate protrusion 156 therein. The connection between the half-pipe channel 148 and the elongate protrusion 156 may be a snap-fit connection as long at the cantilevered members can rotate radially outward as the friction pad wears to prolong the life of the pulley. In another embodiment, the plurality of connectors 154 may be as described below with respect to FIGS. 6-9.

Now referring to the embodiment in FIGS. 6-9, the pulley assembly, generally designed as 216, includes, from left to right based on the orientation of the page, a first bearing 118, a pulley body 132, a bushing 120, a hub 224, a one-way clutch mechanism 222, a biasing member 130, and a second bearing 234. When assembled (FIG. 7), the hub 224, which defines the axis of rotation 236, is disposed within the bore 138 of the pulley body 132 along with a one-way clutch 222. The pulley body 132 includes a belt-engaging surface 139 as part of its exterior surface. The one-way clutch 222 is concentric about the hub 224 and includes a plurality of cantilevered members 240 that each include a friction surface 242 and have a cantilevered end 244 and a free end 246. Each cantilevered member 240 is pivotable about the cantilevered end 244 and is partially nested within an adjacent cantilevered member 250 (labeled in FIG. 8) to form an annular body having the friction surface 242 of each cantilevered member 240 facing the bore 138 of the pulley body 132. The one-way clutch 222 also includes a biasing member 130 contacting at least one of the plurality of cantilevered members 240 to bias the plurality of cantilevered members 240 into continuous frictional engagement with the bore 138 of the pulley body 132. In the embodiment illustrated in FIG. 7, a plurality of biasing members 130 are included with one biasing member 130 per cantilevered member 240 to bias the respective cantilevered member 240 into continuous frictional engagement with the bore 138 of the pulley body 132.

Figure 9:
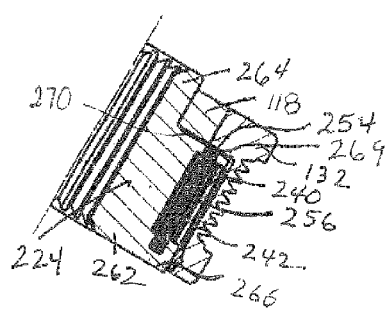
FIG. 9 is a front, plan view of the enlarged section of FIG. 8 taken along line E-E.

In this embodiment, the cantilevered end 244 of each cantilevered member 240 is pivotally connected to the hub 224. The hub 224 has a first end 262 and a second end 264 (labeled in FIG. 9), and, when mounted on an input shaft 78 (shown in FIG. 2), the first end 262 receives the input shaft 78. However, in another embodiment, the second end 264 could receive the input shaft 78 as long as the cantilevered members 240 are oriented to clutch in the appropriate direction, the predominant direction of rotation. Here, the hub 224 includes a flange 266 proximal the first end 262. As seen in FIG. 9, the flange 266 includes a plurality of connectors 254 that are pins 256 seated therein. The cantilevered members 240 each include a female receptacle 258 in the cantilevered end 244, which receives a pin 256 to pivotally connect the cantilevered member 240 to the hub 224. In one embodiment, the plurality of connectors 254 may be integral with the hub 224. In another embodiment, the plurality of connectors may be as described above with respect to FIGS. 3-5.

Still referring to FIG. 9, the hub 224 may also include a shoulder 268 proximate the second end 264 having the first bearing 118 seated thereon. The shoulder 268 may include openings for placement of the biasing member 130 between the hub 224 and the cantilevered members 240. The shoulder 268 may include a lip 269 or have a plate 270 seated thereon that forms the lip 269. The lip 269 extends over the cantilevered members 240 and includes a plurality of holes aligned with the pins 256 to receive one end thereof to stabilize the pins 256.

In operation, the embodiment having a single biasing member has sequential activation of the cantilevered members. As the pulley body rotates in the predominant direction, the cantilevered member biased by the biasing member, through the frictional contact of its friction surface with the bore of the pulley body pivots thereby moving the free end radially outward toward the bore of the pulley body, which in turn lifts the adjacent cantilevered member causing it to pivot its free end radially outward. This in turn is repeated for each of the remaining cantilevered member(s) (if present) as a result of their nested configuration. Once all the cantilevered members are activated the pulley shell is fully locked to the hub for rotation therewith. In an embodiment having a plurality of biasing members, each cantilevered member may be simultaneously activated by the rotation of the pulley body in the predominant direction. In both embodiments, the lifting (pivoting) of the cantilevered members creates a wedging action that wedges the free end of each cantilevered member into a "locked" frictional engagement with the bore of the pulley body so that the pulley body and hub rotate together in this engaged position.

The pulley assembly also allows the hub to disengage from the pulley body to provide overrunning. In the disengage direction, when the input shaft inertia is still requiring the input shaft to spin while the pulley body is slowing down or stopped as a result of a changing condition of the belt, the cantilevered members automatically disengage from the bore of the pulley body, allowing the input shaft and the hub connected thereto to slow down at its own pace. Described another way, during an overrunning condition, the input shaft disengages from the pulley assembly, in particular from the pulley body, and continues to rotate with momentum in the first rotational direction (the predominant direction) when the pulley body experiences a relative torque reversal or sudden slowdown. In this condition, the pulley body may continue to rotate in the first rotational direction but with less angular velocity than the velocity at which it had been driving the input shaft. The sudden decrease of angular velocity at the pulley body has the effect of a relative reversal of torque, which pivots the cantilevered members to move the free end radially inward away from the bore of the pulley body thereby decreasing the frictional engagement between the cantilevered members and the pulley body. As a result, the pulley body uncouples from the hub and is able to slide past the cantilevered members in independent rotation with a minimum amount of force therebetween.

Within the pulley assembly the activation of the one-way clutch can be controlled by selection of the coefficient of friction of the friction surface of the cantilevered members, the coefficient of friction of the bore of the pulley body, the pivot angle of the nested portion of each cantilevered member, and the spring rate of the biasing member. As part of this selection, the biasing member may be a leaf spring, a coil spring, or any other type of compression or torsion spring. The biasing member may also be designed to increase drag in the disengage direction, applying torque that would help slow the input shaft, especially during a shutdown of the belt drive system. This drag is advantageous because it reduces an undesirable "whining" noise that may be created if the input shaft slows down without resistance.

FIGS. 3-9 are illustrated and described above as an accessory pulley (i.e., a driven pulley) and as such the predominant direction is rotation of the pulley in a clockwise direction to activate the cantilevered members. This same pulley assembly if mounted to a crankshaft, becomes a driver pulley, and will still activate the cantilevered members into the pulley body for simultaneous rotation of the hub and pulley as long as the pulley assembly is mounted such that counterclockwise rotation of the hub is the predominant direction.

If it is desired for either of the accessory pulley or the crankshaft pulley to be able to activate upon rotation in the opposite direction to that just discussed above, the cantilevered members may be reversed, i.e., removed, rotated 180 degrees and mounted back in the pulley.

Figure 10:
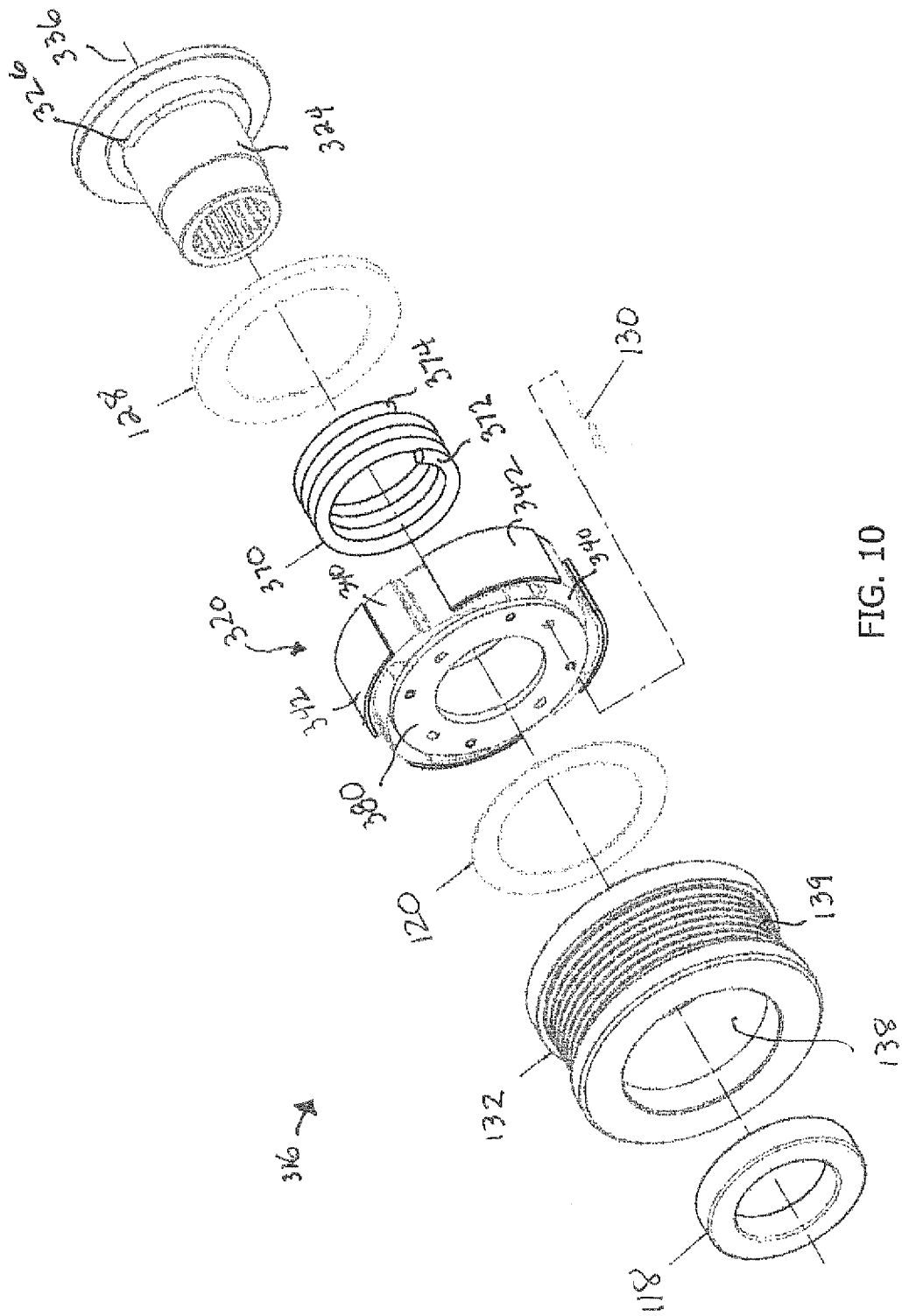
FIG. 10 is an exploded, perspective view of a third embodiment of a pulley assembly for use in a system such as that illustrated in FIG. 1.
Figure 11:
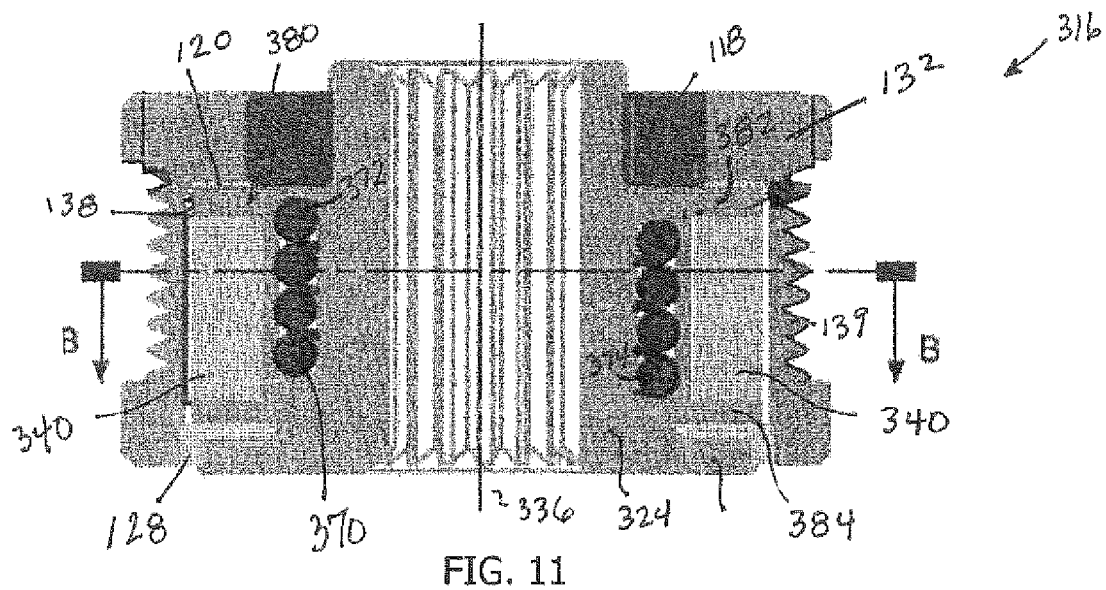
FIG. 11 is a front plan view of a longitudinal cross-section of the pulley assembly of FIG. 10 when assembled.
Figure 12:
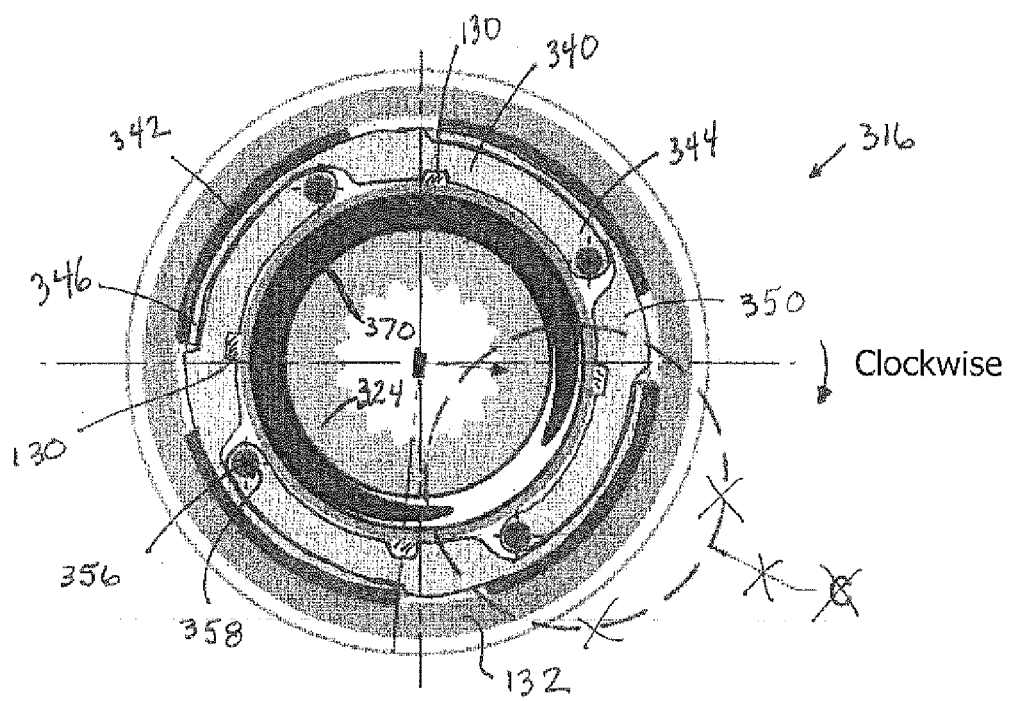
FIG. 12 is a top, plan view of a transverse cross-section of the pulley assembly of FIG. 10 when assembled.

Now referring to the embodiment of FIGS. 10-12, the pulley assembly, generally designed as 316, includes, from left to right based on the orientation of the page, a first bearing 118, a pulley body 132, a bushing 120, a one-way clutch mechanism 320, a biasing member 130, a torsion spring 370, a second bushing 128, and a hub 324. When assembled (FIG. 11), the hub 324, which defines the axis of rotation 336, is disposed within the bore 138 of the pulley body 132 along with the one-way clutch 320. The pulley body 132 includes a belt-engaging surface 139 as part of its exterior surface. The one-way clutch 320 is concentric about the hub 324 and includes a plurality of cantilevered members 340 that each include a friction surface 342 and have a cantilevered end 344 and a free end 346, labeled in FIG. 12. Each cantilevered member 340 is pivotable about the cantilevered end 344 and is partially nested within an adjacent cantilevered member 350 to form an annular body having the friction surface 342 of each cantilevered member 340 facing the bore 138 of the pulley body 132. The one-way clutch 320 also includes a biasing member 130 contacting at least one of the plurality of cantilevered members 340 to bias the plurality of cantilevered members 340 into continuous frictional engagement with the bore 138 of the pulley body 132. As seen in FIG. 12, a plurality of biasing members 130 are included with one biasing member 130 per cantilevered member 340 to bias the respective cantilevered member 340 into continuous frictional engagement with the bore 138 of the pulley body 132. But, as explained above, in another embodiment, one biasing member may be used.

In the embodiment of FIG. 10-12, a torsion spring 370 has been added that is concentric about the hub 324 and is disposed between the hub 324 and a spool 380 that has the cantilevered members 340 circumferentially thereabout. The torsion spring 370 has a first end 372 operationally coupled to the one-way clutch 320 and a second end 374 operationally coupled to the hub 324. The hub 324 includes an abutment feature 326 to receive the second end 374 of the torsion spring 370 such that the spring may be wound or unwound as a result of the rotation of the one-way clutch 320 with the pulley body.

The spool 380 also includes an abutment feature (not shown) to receive the first end 372 of the torsion spring 370 to enable the spring to be wound or unwound. The addition of the torsion spring 370 provides isolation that was not present in the embodiments discussed above. Here, the torsion spring 370 mitigates torsionals transmitted to the hub from the belt drive system to provide a smoother drive operation of the input shaft, i.e., less belt span vibration, tensioner arm movement and lower accessory hub loads). The isolating effect may be adjusted by changing the spring properties through selection of the material from which the spring is made as well as the spring's geometry.

The spool 380 has an upper annularly flanged end 382 and a lower annularly flanged end 384. Upper and lower is relative to the orientation of FIG. 11 on the page. The plurality of cantilevered members 340 are housed between the upper annularly flanged end 382 and the lower annularly flanged end 384. The spool 380 includes a plurality of connectors 356, which may be pins or elongate protrusion as described above, to pivotally connect the cantilevered members 340 to the spool 380 for rotation therewith. The plurality of connectors 356 are illustrated in FIG. 12 as pins. The pins may extend from the upper annularly flanged end 382 to the lower annularly flanged end 384 and may be seated in both to provide stability to the connectors. The cantilevered members 340 each include a female receptacle 358 in the cantilevered end 344, which receives a pin 356 to pivotally connect the cantilevered member 340 to the spool 380.

In operation, the embodiment of FIGS. 10-12 operates essentially as described above, except that the transfer of the rotation of the pulley body 132 is not transferred to the hub 324 until the one-way clutch 320 winds or unwinds the torsion spring 370.

While FIGS. 1-12 are illustrated and described above as an accessory pulley (i.e., a driven pulley) and as such the predominant direction is rotation of the pulley in a clockwise direction to activate the cantilevered members. This same pulley assembly if mounted to a crankshaft, becomes a driver pulley, and will still activate the cantilevered members into the pulley body for simultaneous rotation of the hub and pulley as long as the pulley assembly is mounted such that counterclockwise rotation of the hub is the predominant direction. If it is desired for either of the accessory pulley or the crankshaft pulley to be able to activate upon rotation in the opposite direction to that just discussed above, the cantilevered members may be reversed, i.e., removed, rotated 180 degrees and mounted back in the pulley, and, if necessary, the torsion spring may be changed to wind or unwind in the opposite direction.

Figure 7:
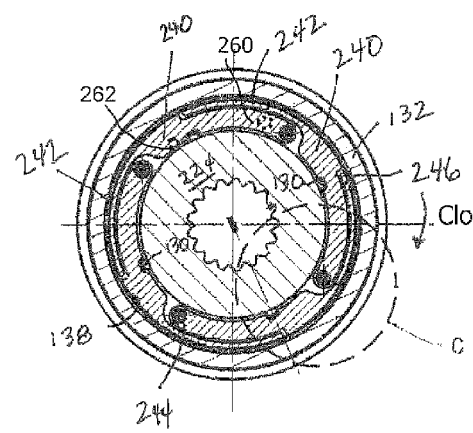
FIG. 7 is a top, plan view of a transverse cross-section of the pulley assembly of FIG. 6 when assembled.
Figure 8:
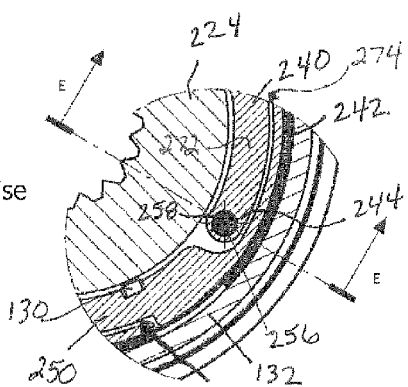
FIG. 8 is an enlarged top plan view of Section C in FIG. 7.

Any of the embodiment herein may include a step 152 as illustrated in FIGS. 3-5 and best seen in FIG. 5. The step 152 is disposed on the surface 170 of the nested portion 172 of each cantilevered member 140 that faces an adjacent cantilevered member 150. The step 152 may be positioned at a location where the free end 146 of the adjacent cantilevered member 150 is seated thereon. In embodiments having a plurality of biasing member 130 such as illustrated in FIGS. 6-9, the step 152 may be omitted. As best seen in FIG. 8, the biasing members 130 are selected to have enough initial biasing to lift the portion of the adjacent cantilevered member 250 having the friction surface 242 axially outward relative to the nested portion 272 of the cantilevered member 240 such that a gap 274 is present therebetween.

In each of the embodiments herein, the belt engaging surface 139 is profiled including V-shaped ribs and grooves to mate with corresponding ribs and grooves on the belt 30. Other configurations are possible, such as cogs, flat or rounded ribs and grooves.

In another embodiment (not shown), the pulley assembly may be a crank pulley and as such the components of the clutch mechanism may be changed to still allow operation in the predominant direction illustrated in the drawings. Here, the one-way clutch is disposed within the bore of the pulley body and concentric about the hub, but the plurality of cantilevered members are pivotally mounted or connected to the bore of the pulley body and the friction surface of each cantilevered member faces the hub, rather than the pulley. Accordingly, the biasing member affiliated with the one or more cantilevered members bias the respective cantilevered member into continuous frictional engagement with the hub, rather than the pulley body. In operation, rotation of the hub in a predominant direction activates the plurality of cantilevered members to link the hub to the pulley body for simultaneous rotation together in the predominant direction. Otherwise the construction and operation of the pulley is substantially similar to that described above and with respect to the figures.

In the embodiments disclosed herein, the pulley assemblies may also include a construction that allows limited slip between the friction surface of the cantilevered members and the surface they are in friction contact with under desired conditions. To provide limited slip to the pulley assemblies the position of the pivot point about which each cantilevered member rotates is moved toward its free end (reference 246 in FIG. 7). Likewise, the biasing member is preferably moved toward the free end as well by the same amount of degrees. The movement of the pivot point also results in the overall length of the cantilevered member being reduced. This concept is illustrated in FIG. 7 by the dashed circle 260 and dashed inset 262. When limited slip is desired, the pivot angle of the cantilevered members is not one that is self-locking, but instead provides a calculated amount of friction torque based on drum brake theory. Once this friction torque is exceeded either by the pulley body (driven) or hub (driver) there would be slip at the engagement plane between the pulley body and hub.

Various parameters can affect the operation, responsiveness, and performance of the pulley assemblies disclosed herein, including the angle of the nested portion of each cantilevered member, the coefficient of friction of the friction surface of each cantilevered member, the coefficient of friction of the bore of the pulley body, the spring rate or the biasing member, and the outer contour shape of the cantilevered members. Other factors that affect the selection of a particular combination include wear, primary clutching, durability and cost. In the disclosed embodiments many advantages are evident. The connection of the cantilevered members to the shaft or spool with a biasing member therebetween allows the biasing member to continually apply pressure to the cantilevered members as the friction surface wears, which increases the life of the pulley. The slender nature of the cantilevered members would provide an axially compact pulley with smaller diameters. Additionally, no axial forces are present within the pulley that would urge disassembly of the components of the pulley assembly, in particular of the clutch mechanism.

The embodiments of this invention shown in the drawing and described above are exemplary of numerous embodiments that may be made within the scope of the appended claims. It is contemplated that numerous other configurations of the pulley assembly may be created taking advantage of the disclosed approach. In short, it is the applicant's intention that the scope of the patent issuing herefrom will be limited only by the scope of the appended claims.

What is claimed:

1. A pulley assembly comprising:
a pulley body having a bore;
a hub defining an axis of rotation disposed within the bore of the pulley body; and
a one-way clutch disposed within the bore of the pulley body and concentric about the hub, the one-way clutch comprising:
a plurality of cantilevered members that each include a friction surface and a cantilevered end, wherein each cantilevered member is pivotable about the cantilevered end and is partially nested within an adjacent cantilevered member to form an annular body having the friction surface of each cantilevered member facing the bore of the pulley body or the hub; and
a biasing member contacting at least one of the plurality of cantilevered members to bias the plurality of cantilevered members into continuous frictional engagement with the bore of the pulley body or the hub;
wherein, when the friction surface of each cantilevered member faces the bore of the pulley body, rotation of the pulley body in a predominant direction activates the plurality of cantilevered members to link the pulley body to the hub for simultaneous rotation together in the predominant direction and, when the friction surface of each cantilevered member faces the hub, rotation of the hub in a predominant direction activates the plurality of cantilevered members to link the hub to the pulley body for simultaneous rotation together in the predominant direction.

2. The pulley assembly of claim 1 further comprising a plurality of biasing members, one biasing member per cantilevered member to bias the cantilevered member into continuous frictional engagement with the bore of the pulley body or the hub.

3. The pulley assembly of claim 1 wherein the hub or the bore of the pulley body includes a plurality of connectors, wherein each connector connects one cantilevered member at its cantilevered end to the hub or the bore of the pulley body.

4. The pulley assembly of claim 3 wherein the plurality of connectors are pins and the cantilevered end of each cantilevered member includes a female receptacle having received therein one of the pins.

5. The pulley assembly of claim 3 wherein the plurality of connectors are elongate protrusions upon which the cantilevered ends of the cantilevered members are seated.

6. The pulley assembly of claim 5 wherein the plurality of connectors are disposed on a sleeve received over at least a portion of the hub or affixed to the bore of the pulley body.

7. The pulley assembly of claim 1 wherein a portion of each cantilevered member that is nested within an adjacent cantilevered member has a surface having a step upon which a free end of the adjacent cantilevered member is seated.

8. The pulley assembly of claim 1 wherein the one-way clutch decouples the pulley body from the hub to provide overrunning when the hub rotates at a greater speed than the pulley body or decouples the hub from the pulley body to provide overrunning when the pulley body rotates at a greater speed than the hub.

9. The pulley assembly of claim 1 further comprising a torsion spring having a first end operationally coupled to the one-way clutch and a second end operationally coupled to the hub; wherein rotation of the pulley body in the predominant direction activates the plurality of cantilevered members to wind or unwind the torsion spring to link the pulley body to the hub for simultaneous rotation together in the predominant direction.

10. The pulley assembly of claim 9 wherein the one-way clutch decouples the pulley body from the hub to provide overrunning when the hub rotates at a greater speed than the pulley body.

11. The pulley assembly of claim 9 wherein the one-way clutch further comprising a spool having a plurality of connectors, the spool having received circumferentially thereabout the plurality of cantilevered members, wherein each of the plurality of connectors connects one cantilevered member at its cantilevered end to the spool.

12. The pulley assembly of claim 11 wherein the plurality of connectors are pins and the cantilevered end of each cantilevered member includes a female receptacle having received therein one of the pins.

13. The pulley assembly of claim 11 wherein the plurality of connectors are elongate protrusions on an exterior surface of the spool upon which the cantilevered ends of the plurality of cantilevered members are seated.

14. The pulley assembly of claim 13 wherein the first end of the torsion spring is seated against a portion of the spool.

15. The pulley assembly of claim 9 further comprising a plurality of biasing members, one biasing member per cantilevered member to bias the cantilevered member into continuous frictional engagement with the bore of the pulley body or the hub.

16. The pulley assembly of claim 1 further comprising a torsion spring having a first end operationally coupled to the one-way clutch and a second end operationally coupled to the bore of the pulley body; wherein rotation of the hub in the predominant direction activates the plurality of cantilevered members to wind or unwind the torsion spring to link the hub to the pulley body for simultaneous rotation together in the predominant direction.

17. The pulley assembly of claim 16 wherein the one-way clutch decouples the hub from the pulley body to provide overrunning when the pulley body rotates asat a greater speed than the hub.

18. The pulley assembly of claim 16 wherein the one-way clutch further comprises a spool having a plurality of connectors, the spool having received circumferentially thereabout the plurality of cantilevered members, wherein each connects one cantilevered member at its cantilevered end to the spool.

19. The pulley assembly of claim 18 wherein the first end of the torsion spring is seated against a portion of the spool.

20. A pulley assembly comprising:
a pulley body having a bore;
a hub defining an axis of rotation disposed within the bore of the pulley body; and
a one-way clutch disposed within the bore of the pulley body and concentric about the hub, the one-way clutch comprising:
a plurality of cantilevered members having a friction surface, a cantilevered end, and a free end, wherein each cantilevered member is pivotable about the cantilevered end and the free end of each cantilevered member is positioned radially outward or inward from the cantilevered end of an adjacent cantilevered member such that pivoting one of the plurality of cantilevered members causes the plurality of cantilevered members to pivot, wherein the plurality of cantilevered members form an annular body having the friction surface of each cantilevered member facing the bore of the pulley body or the hub; and a biasing member contacting at least one of the plurality of cantilevered members to bias the plurality of cantilevered members into continuous frictional engagement with the bore of the pulley body or the hub;

wherein, when the friction surface of each cantilevered member faces the bore of the pulley body, rotation of the pulley body in a predominant direction activates the plurality of cantilevered members to link the pulley body to the hub for simultaneous rotation together in the predominant direction and, when the friction surface of each cantilevered member faces the hub, rotation of the hub in a predominant direction activates the plurality of cantilevered members to link the hub to the pulley body for simultaneous rotation together in the predominant direction.

\* \* \* \* \*